(12) United States Patent
Feldman et al.

(10) Patent No.: US 6,881,600 B2
(45) Date of Patent: Apr. 19, 2005

(54) ETCHING IN COMBINATION WITH OTHER PROCESSING TECHNIQUES TO FACILITATE ALIGNMENT OF A DIE IN A SYSTEM AND STRUCTURES FORMED THEREBY

(75) Inventors: Michael R. Feldman, Huntersville, NC (US); James E. Morris, Charlotte, NC (US); Hongtao Han, Mooresville, NC (US); Xiansong Chen, Charlotte, NC (US); Yinbao Yang, Charlotte, NC (US)

(73) Assignee: Digital Optics Corp, Charlotte, NC (US)

( * ) Notice: Subject to any disclaimer, the term of this patent is extended or adjusted under 35 U.S.C. 154(b) by 36 days.

(21) Appl. No.: 10/628,575

(22) Filed: Jul. 29, 2003

(65) Prior Publication Data

US 2004/0137653 A1 Jul. 15, 2004

Related U.S. Application Data

(60) Provisional application No. 60/398,799, filed on Jul. 29, 2002.

(51) Int. Cl.⁷ .......................... H01L 21/00; G01R 31/26
(52) U.S. Cl. .......................................... 438/33; 438/22
(58) Field of Search ........................ 438/33, 29, 22–23

(56) References Cited

U.S. PATENT DOCUMENTS

| | | | |
|---|---|---|---|
| 4,236,296 A | 12/1980 | Woolhouse et al. |
| 4,729,971 A | 3/1988 | Coleman |
| 4,904,617 A | 2/1990 | Muschke |
| 4,961,821 A | 10/1990 | Drake et al. |
| 5,418,190 A | 5/1995 | Cholewa et al. |

OTHER PUBLICATIONS

Iscoff, R. "Prime cuts: what users want in singulation tools" Chip Scale magazene Aug.–Sep. 2001. <<http://www.chip-scalereview.com/issues/0801/f1_01.html>> viewed Dec. 10, 2004.*

* cited by examiner

*Primary Examiner*—Craig A. Thompson
(74) *Attorney, Agent, or Firm*—Susan S. Morse

(57) ABSTRACT

Etching in combination with other processing techniques is used to facilitate alignment of an optical die in an optical system. The optical dies are formed on a wafer level and need to be singulated for use in the optical system. The formation of a precise edge from etching allows more accurate alignment of the optical die in the optical system. The other processing techniques include dicing, sawing, cleaving, breaking and thinning.

15 Claims, 6 Drawing Sheets

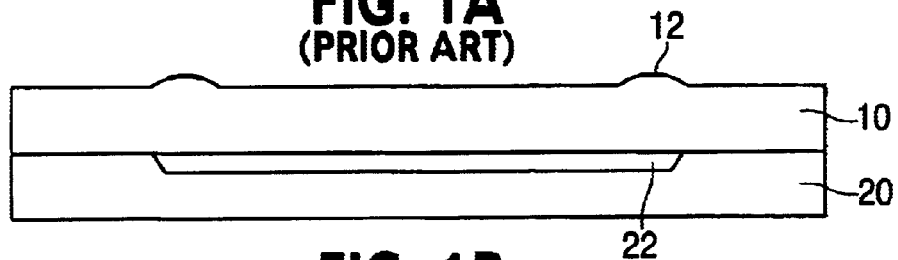
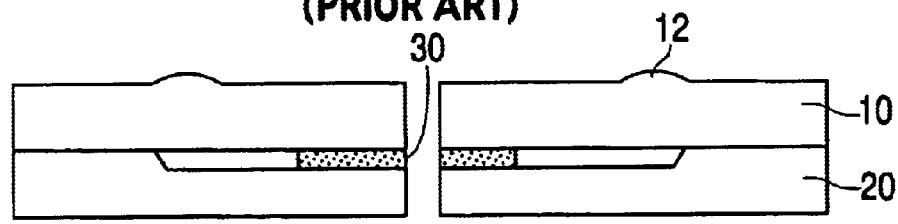
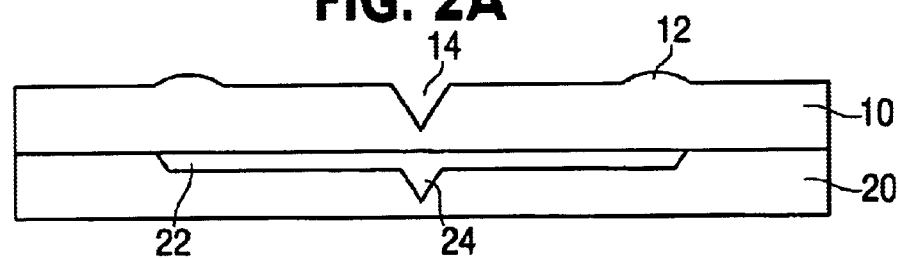
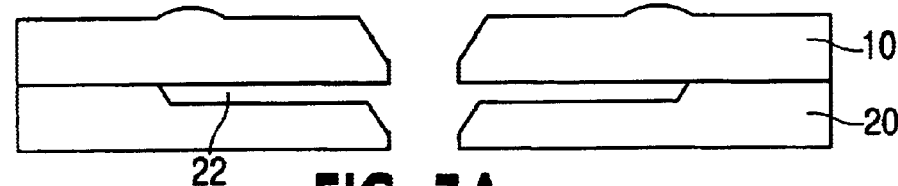
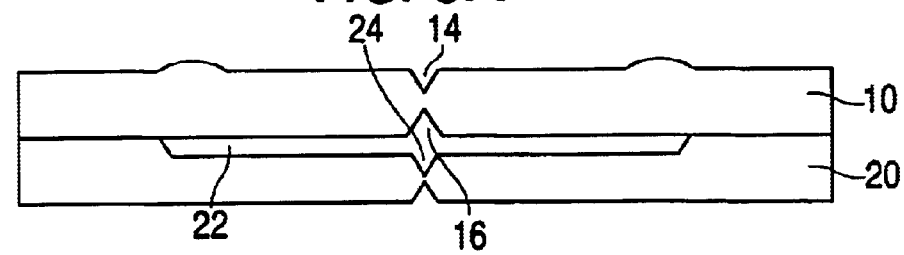
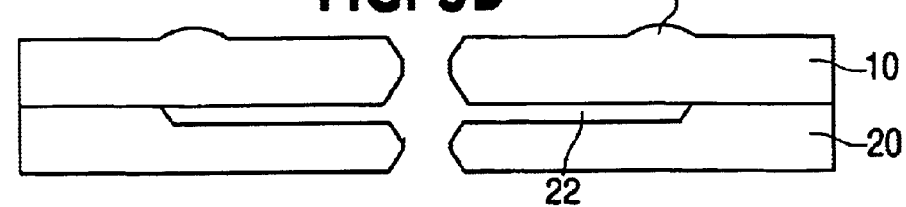

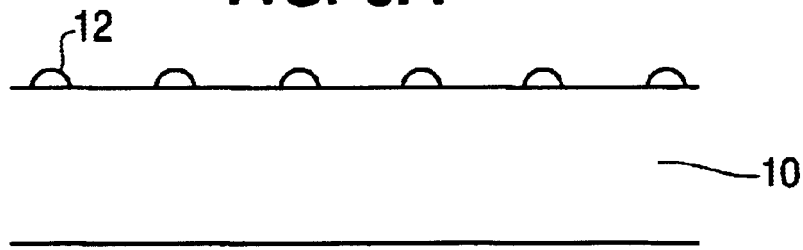
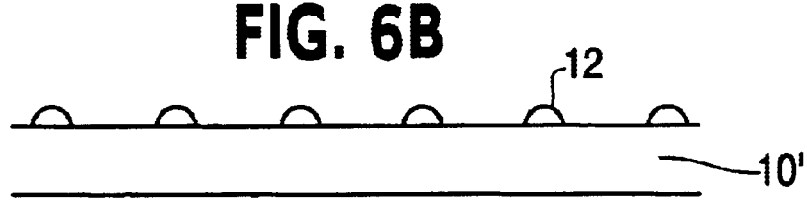
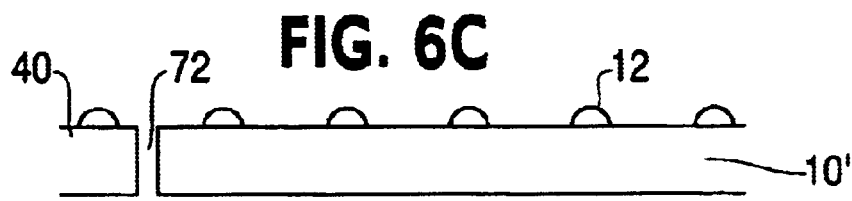
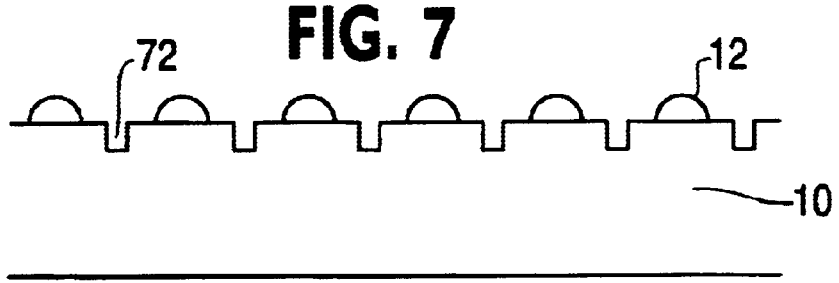
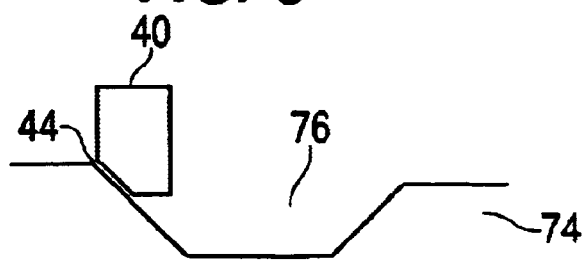

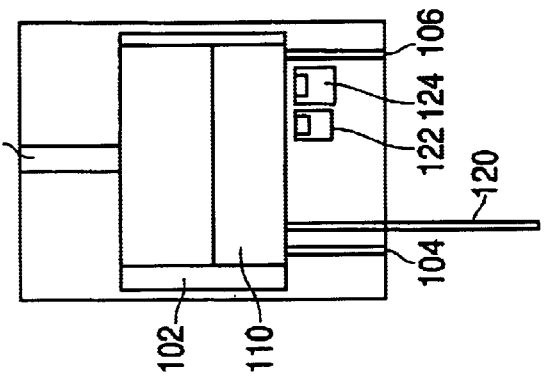
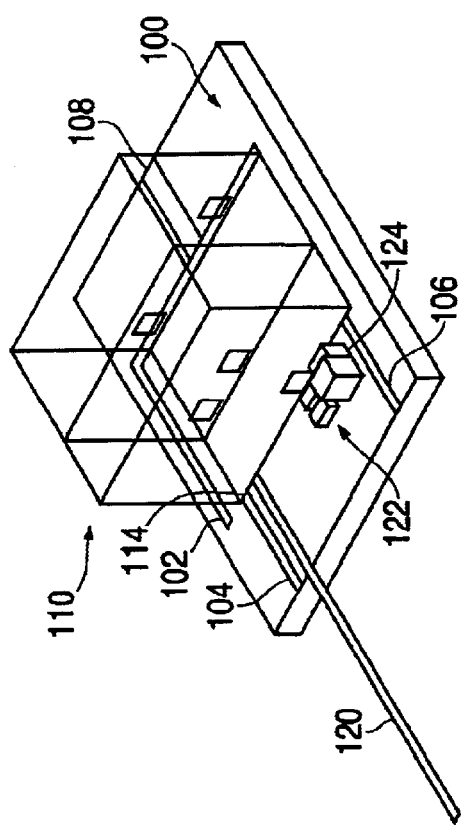
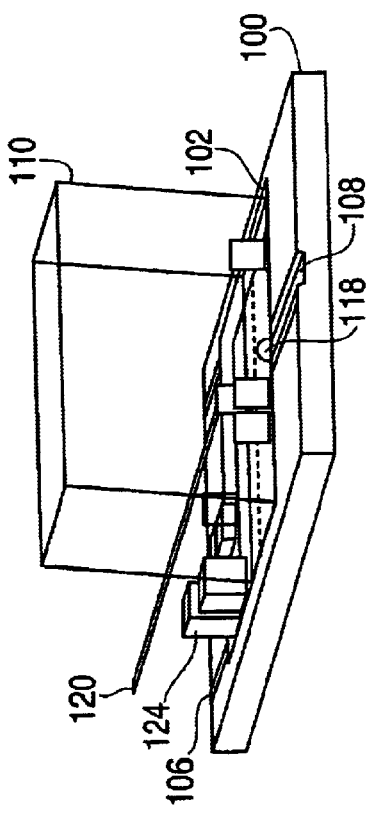

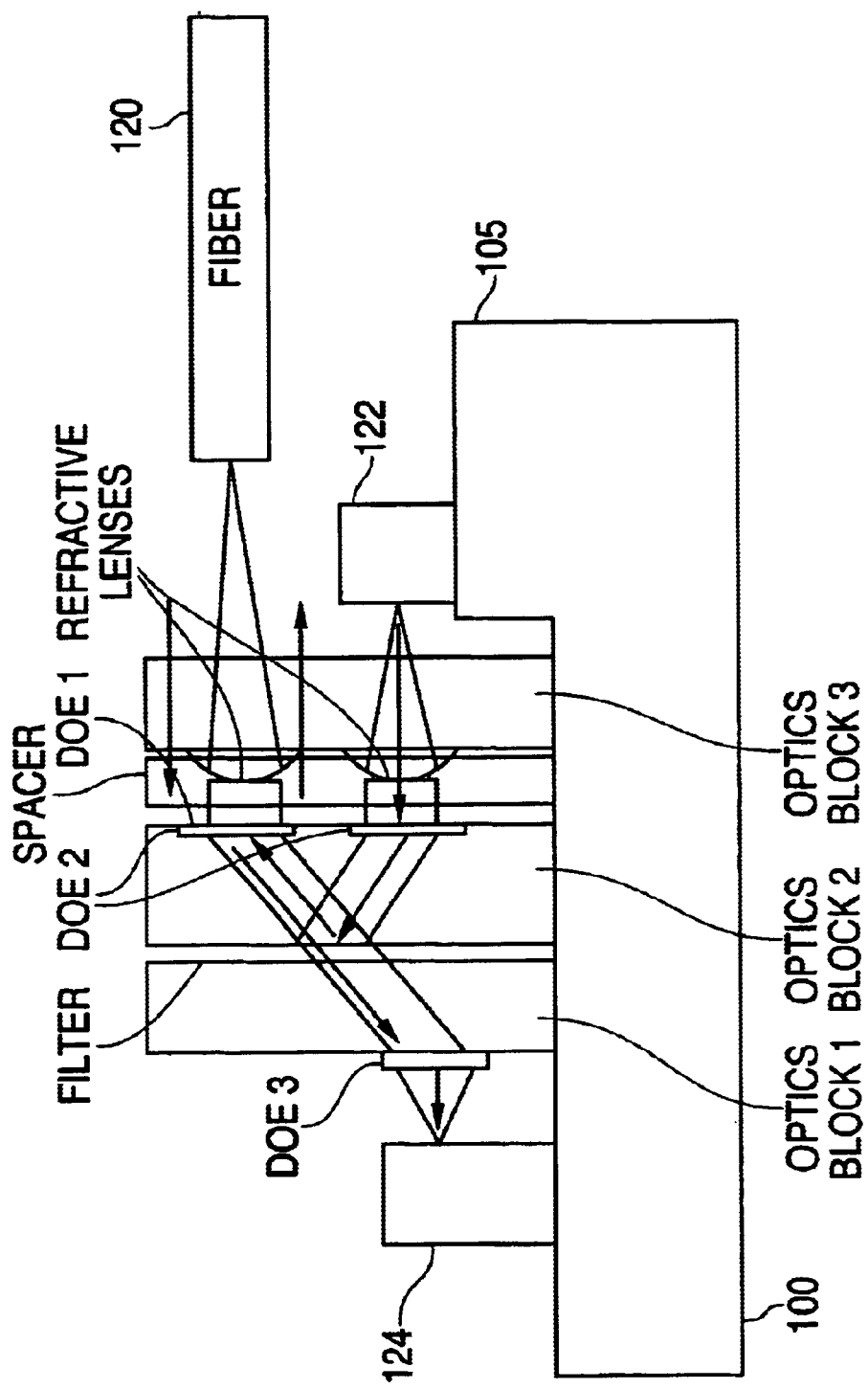

ETCHING IN COMBINATION WITH OTHER PROCESSING TECHNIQUES TO FACILITATE ALIGNMENT OF A DIE IN A SYSTEM AND STRUCTURES FORMED THEREBY

CROSS-REFERENCE TO RELATED APPLICATIONS

The present application claims priority under 35 U.S.C. §119 to U.S. Provisional Patent Application No. 60/398799 filed on Jul. 29, 2002, the entire contents of which are hereby incorporated by reference for all purposes.

BACKGROUND

The present invention is directed to using etching in combination with other processing techniques to facilitate alignment of a die in a system. More particularly, the present invention is directed to singulating dies from a wafer, the resultant singulated die having at least one precise edge and/or to creating channels for aligning optics block on a planar system and alignment features of the optics block to mate with the channels.

Vertical alignment of die features on a wafer level is known. Once the dies are singulated from the wafer, the die itself may have a plurality of aligned features. However, it is often desirable to incorporate the die into a planar system or other system for which the vertical alignment on the wafer level is not efficient.

Separating dies from wafers using a dicing saw can be accurate, but often results in chipping. The accuracy that can be achieved with dicing is around ±10 microns at best, and is more typically ±25 microns. Dies could be separated from a wafer by etching all the way through the wafer, but dry etching takes a long time and wet etching has characteristic angles which are often undesirable.

Further, when aligning optics block or other dies on a bench, rather than vertically as can be performed on a wafer level, there is still a need for alignment features to be accurately provided on both the bench and the die. This is also true for other systems that are not readily amenable to vertical integration, e.g., fibers in a housing.

The present invention is directed to using etching in conjunction with other techniques to overcome at least one of the above problems.

These and other objects of the present invention will become more readily apparent from the detailed description given hereinafter. However, it should be understood that the detailed description and specific examples, while indicating the preferred embodiments of the invention, are given by way of illustration only, since various changes and modifications within the spirit and scope of the invention will become apparent to those skilled in the art from this detailed description.

BRIEF DESCRIPTION OF THE DRAWINGS

The foregoing and other objects, aspects and advantages will be described with reference to the drawings, in which:

FIGS. 1A–1B are side views of a problem with conventional dicing of a die containing an internal groove;

FIG. 2A is a side view of a pair of die to be vertically separated in accordance with the present invention;

FIG. 2B is a side view of the separated pair of die of FIG. 2A;

FIG. 3A is a side view of a pair of die to be vertically separated in accordance with the present invention;

FIG. 3B is a side view of the separated pair of die of FIG. 3A;

FIGS. 6A–6C are side views of a plurality of die to be separated in accordance with the present invention at various stages of separation;

FIG. 7 is a side view of another manner of separating the plurality of dies shown in FIG. 6A;

FIG. 8 is a side view of an application of a precise edge provided in accordance with the present invention;

FIGS. 12A–12C are various views of an electro-optic assembly using grooves in a bench and mating features on the optics block; and FIG. 13 is a side view of another electro-optic assembly using grooves and mating features.

DETAILED DESCRIPTION

Figure 4A:
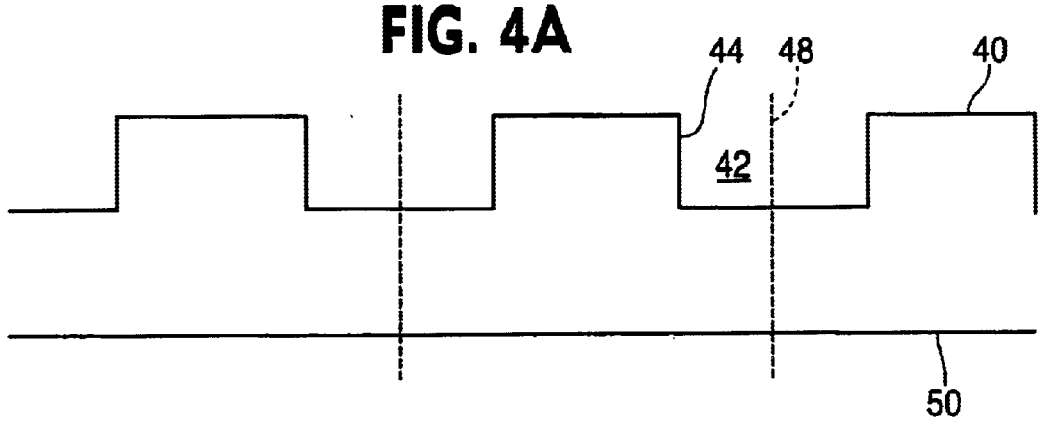
FIG. 4A is a side view of a plurality of die to be separated in accordance with the present invention.

The present invention will be described in detail through embodiments with reference to accompanying drawings. However, the present invention is not limited to the following embodiments but may be implemented in various types. The embodiments are only provided to make the disclosure of the invention complete and make one having an ordinary skill in the art know the scope of the invention. The thicknesses of various layers and regions are emphasized for clarity in accompanying drawings. Also, when a layer is defined to exist on another layer or a substrate, the layer may exist directly on another layer or substrate, or an interlayer layer may be present therebetween. Throughout the drawings, the same reference numerals denote the same elements. As used herein, the term "wafer" means any substrate having more than one optical element thereon to be singulated.

FIGS. 1A–1B illustrate a problem with dicing a vertically integrated die having a groove sandwiched there between. As can be seen therein, a wafer 10 having optical elements 12 and a wafer 20 having a groove 22 are secured together. When these secured wafers are diced to form individual dies, materials 30 such as dicing slurry employed during dicing may get trapped in the groove 22 and are difficult to clean out, thereby contaminating the resulting die. Further, dicing through certain types of material is not always a good option. For example, metal being diced may be smeared, altering the conductivity thereof.

FIGS. 2A–2B illustrate a solution eliminating the contamination shown in FIG. 1B. In FIG. 2A, separation grooves 14 and 24 are etched into the respective wafers 10, 20 along the desired singulation regions. The separation groove 24 in the wafer 20 is formed before the wafer 20 is secured to the wafer 10. The separation grooves 14, 24 are etched sufficiently deep such that they serve as stress points used to cleave the wafers into the individual dies as shown in FIG. 2B without any dicing, and the attendant contaminants.

FIGS. 3A–3B illustrate an alternative solution in which separation grooves 14, 16, 24, 26 are formed on both sides of the singulation region. Separation grooves 16, 24 in the respective wafers 10, 20 are formed before the wafers 10, 20 are secured together. The separation grooves again serve as stress points used to cleave the wafers into the individual dies shown in FIG. 3B, without requiring dicing and the attendant contaminants.

The separation groves may be formed through two-thirds of the wafer and then the wafer may be broken. Alternatively, the groove may be sawed through, e.g., with a beveled blade. Either a wet etch or a dry etch may be used to form the separation grooves.

Figure 4B:
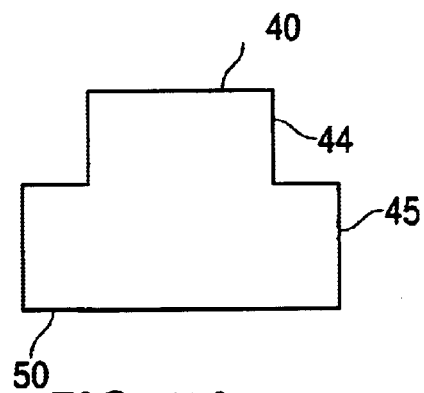
FIG. 4B is a side of the separated die of FIG. 4A.

FIG. 4A is a side view of a plurality of dies to be separated. While these dies are shown as a single wafer, it is to be understood that the dies may include multiple secured wafers. Optical elements may be formed on either a top surface 40 and/or a bottom surface 50. The top surface 40 is dry etched to form wells 42 having precise edges 44, e.g., more precise than realizable from dicing, e.g., within ±5 microns or less. Dicing lines 48 are indicated through the wells 42. In this particular embodiment, the wells 42 are larger than the dicing blades to be used. The dies are singulated by dicing though the wells 42 to form the die as shown in FIG. 4B. This die has precise edges 44 and rough edges 45, and an optical element on a top surface 40 and/or a bottom surface 50. Due to the relative size of the wells 42 and the dicing blades used, the rough edges 45 extend past the precise edges 44.

Figure 5A:
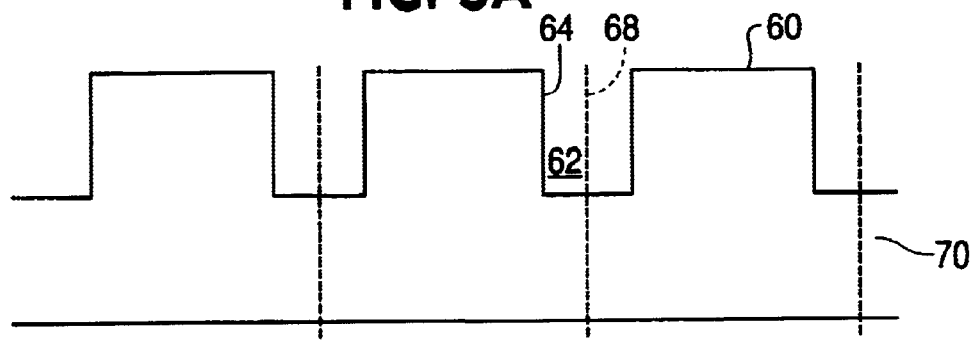
FIG. 5A is a side view of a plurality of die to be separated in accordance with the present invention.
Figure 5B:
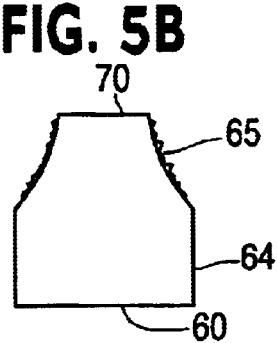
FIG. 5B is a side view of the separated die of FIG. 5A.

FIG. 5A is a side view of a plurality of dies to be separated. While these dies are shown as a single wafer, it is to be understood that the dies may include multiple secured wafers. Optical elements may be formed on either a top surface 60 and/or a bottom surface 70. The top surface 60 is dry etched to form wells 62 having precise edges 64, e.g., more precise than realizable from dicing, e.g., within ±5 microns or less. Dicing lines 68 are indicated through the wells 62. In this particular embodiment, the wells 62 are smaller than the dicing blades to be used. The dies are singulated by dicing through the wells 62 from the bottom surface 70 to form the die as shown in FIG. 4B. This die has precise edges 64 and rough edges 65, and an optical element on a top surface 60 and/or a bottom surface 70. Due to the relative size of the wells 62 and the dicing blades used, the precise edges 64 extend past the rough edges 65.

FIG. 6A is a side view of a plurality of dies to be separated. Optical elements 12 are formed on either surface of a wafer 10. Then, the wafer 10 is thinned, e.g., by wet etching, to a desired thickness as substrate 10', shown in FIG. 6B. Then, a well 72 may be formed, e.g., dry etched, in this thinned wafer 10' to complete separation of the optical elements 12, as shown in FIG. 6C. Alternatively, the well 72 may be formed in the wafer 10, as shown in FIG. 7, and then thinned to complete the separation. During the completion of separation, the dies may be supported on another structure, e.g., a dicing tape or another substrate, and then removed after the thinning or etching. Using these methods, all of the edges may then be precise.

In any of these alternatives, the precise edges may be used to accurately align the optics block in a system. In all of these embodiments, the die will include at least one precise edge from which the distance to a die feature, e.g., an optical element, thereon is accurately known. The exact singulation method chosen will depend on final alignment requirements and the critical alignment position(s) for the die feature.

Uses of such singulated dies are shown in FIGS. 8–11. As can be seen in the side view of FIG. 8, an optical bench 74 includes a v-groove 76. The wet etched accurate surface 44 of the singulated die 40 positions the optical element at the correct height and angle of the v-groove 76.

Figure 9:
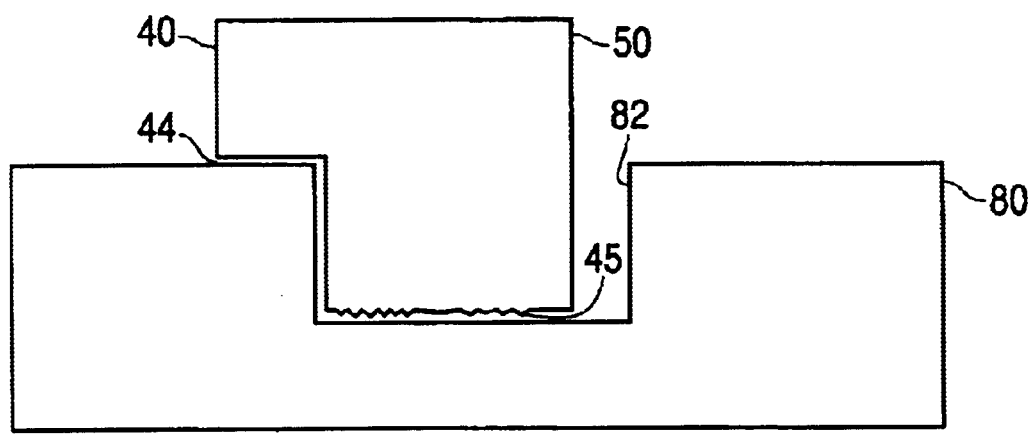
FIG. 9 is a side view of another application of a precise edge provided in accordance with the present invention.

As can be seen in FIG. 9, an optical bench 80 includes an indent 82 therein for receiving the optics block 40. The singulated die 40 includes top and bottom surfaces 40, 50 either or both of which may include an optical element thereon. Due to the singulation discussed above, the optics block includes precise edges 44 and rough edges 45. Here, the critical alignment positions are the height above the optical bench 80 and the position along the optics block 80. The precise edges 44 allow accurate alignment of the optics block within the indent 82. The alignment is not effected by the rough edges 45, since the precise edges abut the indent 82.

Figure 10:
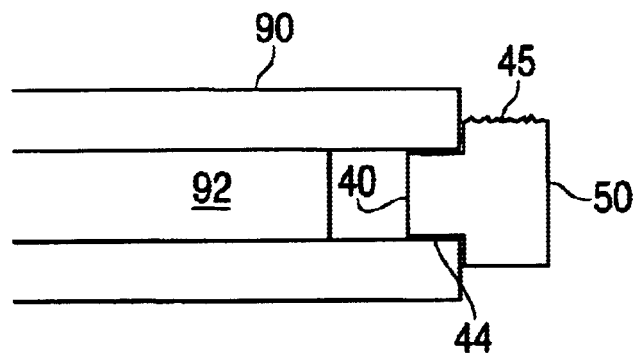
FIG. 10 is a side view of another application of a precise edge provided in accordance with the present invention.

In FIG. 10, the singulated die 40 is inserted in a ferrule 90 housing an optical fiber 92. Again, an optical element may be on either or both of the surfaces 40, 50. Here the critical dimension is the distance of the die features from the fiber 92. The precise edges 44 allow the accurate positioning of the optics block in the ferrule 90 to be realized, while the rough edges 45 do not effect any such alignment.

Figure 11:
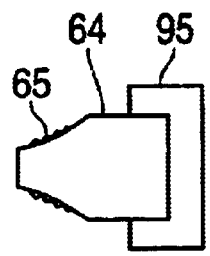
FIG. 11 is a side view of yet another application of a precised edge provided in accordance with the present invention.

In FIG. 11, the singulated die 40 is inserted into a holder 95 to further facilitate alignment in a system. Here the critical positions will be fitting into the aperture in the holder 95. The precise edges 64 allow the alignment of the optics block in the holder 95 to be realized, while the rough edges 65 do not effect any such alignment.

FIGS. 12A–12C illustrate how etching may be employed to provide alignment of an optics block to a bench. The configuration shown therein includes an optical bench 100 with an indent 102, a fiber 120 in a groove, block grooves 104, 106, 108 for aligning an optics block 110 in the indent 102, a laser and monitor 122, and a detector 124. The indent 102 may be accurately formed using etching The optics block 110 includes mating features 114, 116, 118 protruding from front and back surfaces of the die for mating with corresponding grooves 104, 106, 108. These mating features may be formed precisely on a wafer level using lithographic techniques. The mating features may be etched into the optics block 110 or may be added onto the optics block, e.g., a photoresist, e.g., SU8. These alignment features are accurately provided so that the distances to a die feature, e.g., an optical element, thereon to the alignment features are accurately known.

FIG. 13 illustrates another use of the grooves in an optical bench 100 and mating features on the optics block 110 (not shown in this side view, but of the same structure as in FIGS. 9A–9C). In this particular embodiment, the optics block 110 includes three constituent optics block and a spacer block, all of which may be bonded on a wafer level and singulated to form the optics block 110. The optics block includes three diffractive optical elements (DOE), two refractive lenses and a filter for communicating between the laser 122, the detector 124 and the fiber 120. In this configuration, the fiber 120 is provided in a housing or connector (not shown) to be aligned with the optical bench 100. Here, the laser 122 and the detector 124 are on opposite sides of the optics block 110, and the laser 122 is mounted on a platform 105 of the optics block. Since this platform 105 may be formed from etching, the respective heights of the laser 122 and the detector 124 are well controlled.

Alternatively, a groove in an optical bench may have solder inserted therein and the optics block may have metal on a surface to be mounted on the optical bench. The solder may be reflowed to align the optics block and the other elements on the optical bench. The optics block may include corresponding grooves or extensions therein to increase the surface area for the solder, thereby strengthening the mating between the optics block and the bench. Here, the mating features of the optics block would be on a mating surface thereof, rather than the front or back surfaces. For these embodiments including block grooves and corresponding mating features, the singulation edges do not need to be very precise, since they are not relied on for the alignment. Also, the grooves may be formed using wet etching, since the depth of the block groove may also be employed as a stop, as it will narrow towards the bottom of the block groove, to insure a proper height of the die features in the system.

Therefore, in accordance with the present invention, features for aligning a die to a system include precisely formed edges and/or mating features that mate with grooves in a planar system. There may be systems that require both types of alignment features. A part of the creation of the alignment scheme uses etching to accurately control alignment. This etching is used in conjunction with other processing techniques, e.g., sawing, cleaving, dicing, lithography, another type of etching, to realize the alignment scheme.

What is claimed is:

1. A method of integrating an optical element in an optical system comprising:

forming a plurality of optical elements on a top surface of a substrate:

etching a separation well having etched edges in at least one of the top surface of the substrate and a bottom surface of a substrate for each optical element;

completing separation through the separation well using a non-etching technique to form singulated optical elements; and aligning a singulated optical element with the optical system using an etched edge.

2. The method of claim 1, wherein a separation well is formed on both the top and bottom surfaces of the substrate.

3. The method of claim 1, further comprising, before said completing separation, securing another substrate to the substrate.

4. The method of claim 1, further comprising, before said completing separation, securing a corresponding plurality of dies to the substrate.

5. The method of claim 1, wherein said etching is performed before said forming.

6. The method of claim 1, wherein said completing separation includes breaking the substrate along the separation wells.

7. The method of claim 1, wherein said completing separation includes dicing along the separation wells.

8. The method of claim 7, wherein said dicing includes dicing through the separation wells using a dicing blade narrower than the separation wells.

9. The method of claim 7, wherein said dicing includes dicing through the substrate on the surface opposite the separation wells using a dicing blade wider than the separation wells.

10. The method of claim 1, wherein said completing separating includes thinning the substrate.

11. A method of creating a plurality of optical elements comprising:

forming a plurality of optical elements on a top surface of a substrate;

etching a corresponding plurality of separation wells on the top surface;

thinning the substrate from a back surface of the substrate, the combination of the thinning and etching singulate the optical elements.

12. The method of claim 11, wherein during completion of the singulating, the optical elements are provided on a support structure.

13. The method of claim 11, wherein the etching occurs before the thinning.

14. The method of claim 13, wherein the etching and the forming are simultaneous.

15. The method of claim 11, wherein the etching occurs after the thinning.

* * * * *